Patented Oct. 1, 1940

2,216,140

UNITED STATES PATENT OFFICE 2,216,140

COMPOSITION FOR AND METHOD OF DEVITALIZING MICROORGANISMS

Randolph Norris Shreve, West Lafayette, Ind., and Miller Woodson Swaney, Bloomfield, N. J., assignors to Mallinckrodt Chemical Works, St. Louis, Mo., a corporation of Missouri No Drawing. Application May 19, 1938, Serial No. 208,860

4 Claims. (Cl. 167—33)

This invention relates to compositions for and methods of devitalizing microorganisms, and with regard to certain more specific features, to such compositions including pyridylmercuric compounds as active constituents thereof.

This application is in part a continuation of our application Serial No. 35,626, filed August 10, 1935, entitled "Germicides."

Among the several objects of the invention may be noted the provision of compositions of the class described which are of enhanced devitalizing powers, without exhibiting undesirable toxic characteristics, and which have enhanced solubility over prior analogous compositions; the provision of methods of devitalizing microorganisms employing new compositions of matter for this purpose; and the provision, as new compositions of matter, of a new pyridylmercuric compound valuable as a microorganism-devitalizing agent. Other objects will be in part obvious and in part pointed out hereinafter.

The invention accordingly comprises the elements and combinations of elements, steps and sequence of steps, and features of composition and procedure, which will be exemplified in the products and methods hereinafter described, and the scope of the application of which will be indicated in the following claims.

Many metallo-organic compounds, such as organic compounds of mercury, have heretofore been found to be valuable devitalizing agents for microorganisms. A particular class of mercury compounds that have been found satisfactory are the phenylmercuric salts, but these are frequently but slightly soluble in water, this feature obviously decreasing their utility. The present inventors have discovered that pyridylmercuric compounds, and, more specifically, the salt pyridylmercuric nitrate, likewise possess valuable microorganism-devitalizing properties. Bacteriostatic tests in some instances, as for example against B. coli, show that the pyridylmercuric compounds are more powerful than the corresponding phenylmercuric compounds. The pyridylmercuric compounds are generally more soluble in water, whereby they may be prepared in reasonably concentrated aqueous solutions. For this reason alone, they comprise a more advantageous devitalizing agent than the analogous phenylmercuric salts.

A general method for preparing pyridylmercuric nitrate is as follows: Pyridine and mercuric acetate are reacted together, giving pyridylmercuric acetate according to the equation:

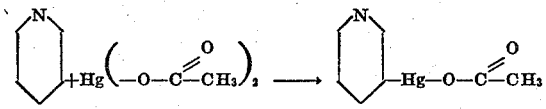

From the pyridylmercuric acetate thus formed, pyridylmercuric nitrate may be formed, by treatment as indicated in the following equation:

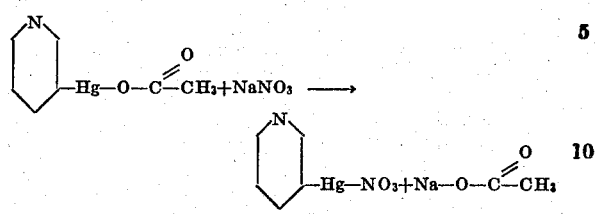

The actual laboratory procedure may be as follows:

Mercuric acetate (100 grams) and pyridine (200 cc.) are heated together in a glass-lined autoclave for two hours at 180° C. After cooling, the product (175 cc.) is filtered from the insoluble residue (33.5 grams) and laced in a vacuum distillation apparatus. From this, at least 140 cc. of pyridine may be removed and recovered. The residue in the flask, a dark tarry substance, is transferred to a beaker and covered with 100 cc. of ether. After slow stirring for some time the mass becomes granular. The granular mass, which is the crude acetate, is filtered and dried. It melts at 135 to 145° C. The crude acetate is then extracted with hot benzene with the aid of a small amount of norite. After filtering, the benzene is allowed to cool, and white feathery needles of the pure pyridylmercuric acetate separate out. This product is desirably again recrystallized from benzene, and finally from carbon tetrachloride. The pure acetate, in the form of white feathery needles, melts at about 178° C. It is very soluble in both water and alcohol.

The pure pyridylmercuric acetate is dissolved in water and an aqueous solution of sodium nitrate is slowly added with stirring. A white crystalline solid, pyridylmercuric nitrate, separates, and is desirably recrystallized from water in short white crystals. These crystals, heated to 360° C., do not melt, but turn black. However, if a portion of the nitrate is placed in a capillary tube, which is then, without previous heating, directly placed in an oil bath at about 308 to 310° C., it is found to decompose explosively. The salt was shown by analysis to be the nitrate, and not the basic nitrate as is formed in the analogous phenyl compound. This salt is soluble in water to the extent of 1.896 grams per liter at 25° C.

The pyridylmercuric nitrate described was shown to have the mercury atom attached to the 3- or beta-carbon atom in the pyridine nucleus.

The microorganism-devitalizing activity of the pyridylmercuric nitrate of the present invention is particularly well demonstrated in its antiseptic activity with respect to various forms of bacteria.

For example, tests in vitrio have shown the following activities:

| Bacteriostatic index, or maximum effective dilution in aqueous solution, against— | |
|---|---|
| *Staphylococcus aureus* | *Bacillus colon* |
| 1,700,000 | 400,000 |

The bacteriostatic index of the above table was determined in accordance with the method of Tetrault, which is as follows:

To a sterile tube containing a known quantity of the pyridylmercuric nitrate in aqueous solution, 9.5 cc. of a sterile agar solution containing 2% agar, 1% peptone, and 0.3% beef extract is added. One 2 mm. loopful of a twenty-four hour culture of the organism is then added to the tube. The contents of the tube are then poured into a petri dish and incubated at 37° C. for forty-eight hours. The dish is then examined for growth of the organism. The experiment is repeated for different dilutions of the substance until a dilution is reached beyond which growth takes place. This dilution is expressed as cubic centimeters of water per gram of substance, and is the bacteriostatic index of the foregoing table.

The pyridylmercuric nitrate of the present invention is likewise found to be relatively nontoxic to mammals when used in bacteriostatic dosages.

The relatively increased solubility of the compound of the present invention in comparison, for example, with the analogous phenylmercuric compound, in water is important, because it thereby becomes possible to prepare relatively concentrated aqueous solutions which are exceedingly effective in devitalizing bacteria and microorganisms of other types.

Not only is the compound of the present invention useful as a bacteriostatic or antiseptic agent, but it is also of demonstrable utility as a disinfectant, for seed disinfection, for example, and as a fungicide, for preventing the moulding or decay of wood pulp, paper, and paints, for example. In such uses, which are of an industrial character, the compound of the present invention can be used directly in their crude condition, without necessarily being purified.

In general, for its antiseptic use, the compound of the present invention is employed in its aqueous solutions, where it presents the cation $R-Hg+$. Antiseptic or bacteriostatic effects are then secured merely by applying the solution to the microorganisms in the infected location, in any of the known methods of application. The compound is also effective in other solvents, for example alcohol, or an alcohol-acetone mixture, or it may, with satisfaction, be incorporated into ointments, with a greasy or unguent vehicle. In some circumstances, it may even be used in powdered solid form, for dusting on the infected location.

Attention is directed to our copending application Serial No. 326,968, filed March 30, 1940.

In view of the above, it will be seen that the several objects of the invention are achieved and other advantageous results attained.

As many changes could be made in carrying out the above compositions and methods without departing from the scope of the invention, it is intended that all matter contained in the above description shall be interpreted as illustrative and not in a limiting sense.

We claim:
1. A composition for devitalizing microorganisms comprising pyridylmercuric nitrate.
2. The method of devitalizing microorganisms which comprises subjecting them to the action of pyridylmercuric nitrate.
3. 3-pyridylmercuric nitrate.
4. 3-pyridylmercuric nitrate, being a substance in the form of white crystals which, when heated to about 360° C., does not melt, but turns black; but which, when in a capillary tube, is then, without previous heating, placed directly in an oil bath at about 308–310° C., decomposes explosively; and which is soluble in water to the extent of about 1.896 g. per liter at 25° C.; and which is useful as a germicide.

RANDOLPH NORRIS SHREVE.
MILLER WOODSON SWANEY.